United States Patent
Tokusaki et al.

(10) Patent No.: US 11,290,024 B2
(45) Date of Patent: Mar. 29, 2022

(54) POWER SUPPLY CONTROL DEVICE, POWER CONVERSION SYSTEM, AND POWER SUPPLY CONTROL METHOD

(71) Applicants: OMRON Corporation, Kyoto (JP); NATIONAL UNIVERSITY CORPORATION HOKKAIDO UNIVERSITY, Sapporo (JP)

(72) Inventors: Hiroyuki Tokusaki, Nara (JP); Takashi Hyodo, Kusatsu (JP); Satoshi Ogasawara, Sapporo (JP); Wataru Kodaka, Sapporo (JP)

(73) Assignees: OMRON Corporation, Kyoto (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 357 days.

(21) Appl. No.: 16/490,066

(22) PCT Filed: Nov. 21, 2017

(86) PCT No.: PCT/JP2017/041752
§ 371 (c)(1),
(2) Date: Aug. 29, 2019

(87) PCT Pub. No.: WO2018/159026
PCT Pub. Date: Sep. 7, 2018

(65) Prior Publication Data
US 2020/0014308 A1  Jan. 9, 2020

(30) Foreign Application Priority Data
Mar. 2, 2017 (JP) .............................. JP2017-039782

(51) Int. Cl.
*H02M 5/29* (2006.01)
*H02M 5/293* (2006.01)

(52) U.S. Cl.
CPC .................................. *H02M 5/293* (2013.01)

(58) Field of Classification Search
CPC ...................................................... H02M 5/293
See application file for complete search history.

(56) References Cited

U.S. PATENT DOCUMENTS

| 5,483,435 A | 1/1996 | Uchino |
| 10,263,539 B2 | 4/2019 | Yuasa et al. |

(Continued)

FOREIGN PATENT DOCUMENTS

| CN | 105322807 A | 2/2016 |
| CN | 105981280 A | 9/2016 |

(Continued)

OTHER PUBLICATIONS

Chinese Office Action ("CNOA") dated Nov. 27, 2020 in a related Chinese patent application.
Extended European search report dated Jun. 17, 2020 in a counterpart European patent application.

(Continued)

*Primary Examiner* — Rafael O De Leon Domenech
(74) *Attorney, Agent, or Firm* — Metrolex IP Law Group, PLLC

(57) ABSTRACT

A power supply control device according to one or more embodiments may be provided to: control a power conversion device that has a configuration in which a resonant circuit is provided on an output side of a matrix converter including switching circuits having snubber elements, and that performs AC-AC conversion of output from a multiphase AC power supply. The power supply control device performs control such that: the output current, which has a phase difference caused by the resonant circuit, is negative during a period in which an absolute value of a positive-going output voltage that is output from the power conversion device increases while the output current is positive (Continued)

during a period in which the absolute value of a negative-going output voltage increases; and a polarity of the output current does not change within a period in which the snubber element is discharged.

7 Claims, 13 Drawing Sheets

(56) References Cited

U.S. PATENT DOCUMENTS

| | | |
|---|---|---|
| 2014/0254230 A1* | 9/2014 | Inomata ................ H02M 5/297 363/163 |
| 2015/0256095 A1 | 9/2015 | Ohta |
| 2016/0006345 A1 | 1/2016 | Toshinaga et al. |
| 2016/0352238 A1 | 12/2016 | Ogasawara et al. |

FOREIGN PATENT DOCUMENTS

| | | |
|---|---|---|
| EP | 2963792 A1 | 1/2016 |
| EP | 3104510 A1 | 12/2016 |
| JP | 2010-263702 A | 11/2010 |
| JP | 2014-045566 A | 3/2014 |
| JP | 2015-149857 A | 8/2015 |
| WO | 2014/020898 A1 | 2/2014 |

OTHER PUBLICATIONS

Extended European search report dated Jun. 9, 2020 in a related European patent application.
English translation of the International Search Report("ISR") of PCT/JP2017/041752 dated Jan. 23, 2018.
English translation of the Written Opinion("WO") of PCT/JP2017/041752 dated Jan. 23, 2018.
Notice of Allowance dated Aug. 7, 2020 in a related U.S. Appl. No. 16/489,703.

* cited by examiner (a)

(b)

(c)

(a)

(b)

POWER SUPPLY CONTROL DEVICE, POWER CONVERSION SYSTEM, AND POWER SUPPLY CONTROL METHOD

TECHNICAL FIELD

The present invention relates to a power supply control device to control a power conversion device that is connected to a multi-phase AC power supply for every phase and that performs AC-AC conversion by a plurality of switching circuits so as to output the converted power via a resonant circuit. The present invention also relates to a power conversion system including the power supply control device, and to a power supply control method executed by the power conversion system.

BACKGROUND ART

A power conversion device draws the attention, in which power is input from a multi-phase AC power supply and is output to a load side after being subjected to AC-AC conversion by a matrix converter. The matrix converter turns on/off respective switching circuits each connected to a corresponding phase of the multi-phase AC power supply as an input so as to perform AC-AC conversion without conversing the power into a direct current, and outputs the alternating current power to the load side. The matrix converter controls switching of a bidirectional switch according to the voltage, frequency and the like of the alternating current power to be output to the load side. The matrix converter that converts an alternating current power into an alternating current power can reduce conversion loss and furthermore can easily realize the size reduction because no inverter is needed, compared to the power conversion with an inverter in which power is converted from an alternating current power into a direct current power, and after that once again is converted into an alternating current power.

The applicants of the present invention have already disclosed a soft switching technique in the matrix converter (see Patent Document 1). In this technique, the switching is performed in the state in which the voltage or the current is zero as a result of a phase difference between the voltage and the current generated by a resonant circuit provided on the output side.

With the soft switching, it is possible to obtain various effects such as: reduction of switching loss; prevention of degradation of conversion efficiency; and reduction of stress applied to a semiconductor device, compared to hard switching that performs conversion by forcibly switching on/off the circuits in the state in which the voltage is applied and the current flows.

PRIOR ART DOCUMENT

Patent Document

[Patent Document 1] JP 2015-149857 A

SUMMARY OF THE INVENTION

Problem to be Solved by the Invention

The applicants of the present invention have further developed the technique disclosed in Patent Document 1 above so as to improve transmission efficiency.

The present invention was made in consideration of the above circumstances. A principal object of the present invention is to provide a power supply control device capable of improving output transmission efficiency by optimizing a current phase.

Also, another object of the present invention is to provide a power conversion system using the power supply control device according to the present invention.

Furthermore, another object of the present invention is to provide a power supply control method that can be executed in the power conversion system according to the present invention.

Means for Solving the Problem

In order to solve the above problem, a power supply control device of the present invention is configured to control a power conversion device including a plurality of switching circuits that is connected to a multi-phase AC power supply for every phase and that each has a snubber element capable of being charged and discharged. The power conversion device is configured to: perform AC-AC conversion of input from the multi-phase AC power supply by the plurality of switching circuits; and output the converted AC power via a resonant circuit. The power supply control device includes: waveform creating means for creating a staircase waveform of an output voltage that is output from the power conversion device; phase difference deriving means for deriving a phase difference between a phase of a fundamental wave of the output voltage that is output from the power conversion device and a phase of an output current based on (i) the phase of the fundamental wave of the output voltage according to the staircase waveform created by the waveform creating means, (ii) a rising phase that is a phase when an absolute value of the output voltage indicated by the staircase waveform created by the waveform creating means reaches a maximum value, and (iii) a discharge phase difference based on a period necessary for discharge of the snubber element; frequency deriving means for deriving a frequency to obtain the phase difference derived by the phase difference deriving means; and controlling means for controlling the switching circuits of the power conversion device so as to realize the frequency that is derived by the frequency deriving means.

In the power supply control device, the phase difference deriving means derives the phase of the fundamental wave of the output voltage based on a result of the Fourier series expansion of the staircase waveform created by the waveform creating means.

In the power supply control device, the phase difference deriving means derives the discharge phase difference of the snubber element based on: changes in the output voltage based on the staircase waveform created by the waveform creating means; and a magnitude of the output current that is obtained by characteristics of the resonant circuit and an amplitude of the fundamental wave of the output voltage according to the result of the Fourier series expansion of the staircase waveform created by the waveform creating means.

In the power supply control device, the controlling means controls an output frequency by performing switching control of the switching circuits based on the phase difference derived by the phase difference deriving means.

The power supply control device further includes: command value reading means for reading an output voltage command value that is set; and voltage detecting means for detecting an input voltage for every phase that is input from the multi-phase AC power supply. The waveform creating means creates the staircase waveform based on the output voltage command value read by the command value reading means and the input voltage for every phase detected by the voltage detecting means.

The power supply control device is configured to control a power conversion device including a plurality of switching circuits that is connected to an AC power supply and that each has a snubber element capable of being charged and discharged. The power conversion device is configured to: perform AC-AC conversion of input from the AC power supply by the plurality of switching circuits; and output the converted AC power via a resonant circuit. The power supply control device performs control such that: an output current, which has a phase difference caused by the resonant circuit, is negative during a period in which an absolute value of a positive-going output voltage that is output from the power conversion device increases while the output current is positive during a period in which the absolute value of a negative-going output voltage increases; and a polarity of the output current does not change within the period in which the snubber element is discharged.

Furthermore, a power conversion system of the present invention includes a power conversion device and the power supply control device configured to control the power conversion device. The power conversion device includes a plurality of switching circuits that is connected to a multi-phase AC power supply for every phase and that each has a snubber element capable of being charged and discharged. The power conversion device is configured to: perform AC-AC conversion of input from the multi-phase AC power supply by the plurality of switching circuits; and output the converted AC power via a resonant circuit.

Furthermore, a power supply control method of the present invention is to control a power conversion device including a plurality of switching circuits that is connected to an AC power supply and that each has a snubber element capable of being charged and discharged. The power conversion device is configured to: perform AC-AC conversion of input from the AC power supply by the plurality of switching circuits; and output the converted AC power via a resonant circuit. In the power supply control method, the control is performed such that: an output current, which has a phase difference caused by the resonant circuit, is negative during a period in which an absolute value of a positive-going output voltage that is output from the power conversion device increases while the output current is positive during a period in which the absolute value of a negative-going output voltage increases; and a polarity of the output current does not change within the period in which the snubber element is discharged.

With the power supply control device, the power conversion system and the power supply control method of the present invention, it is possible to optimize the current phase.

Effect of the Invention

In the present invention, a desirable phase difference is derived based on: a rising phase that is a phase when the absolute value of the output voltage indicated by a staircase waveform from the power conversion device reaches the maximum value; and a phase according to a period necessary for discharge of the snubber element included in the switching circuit. Thus, the power conversion device is controlled in accordance with the derived phase difference, which results in a current phase being optimized. Therefore, it is possible to perform switching at a desirable timing, which leads to advantageous effects such as increase of power factor on the output side and improvement of output transmission efficiency.

MEANS FOR CARRYING OUT THE INVENTION

Hereinafter, an embodiment of the present invention will be described with reference to the drawings. The embodiment described below is an embodied example of the present invention, which does not limit the technical scope of the present invention.

<Power Conversion System>

Figure 1:
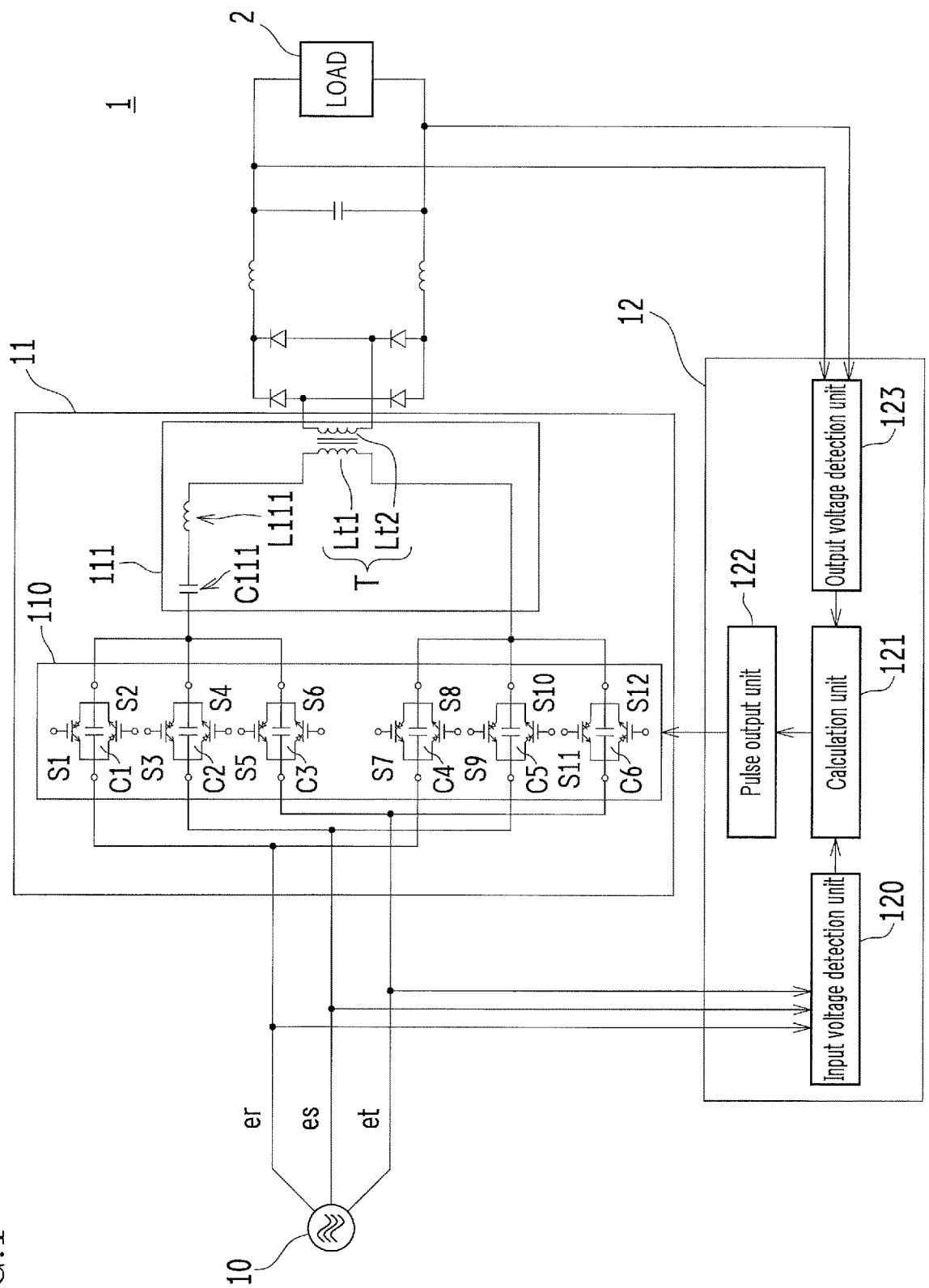
FIG. 1 is a schematic configuration diagram illustrating an example of a circuit configuration of a power conversion system of the present invention.

FIG. 1 is a schematic configuration diagram illustrating an example of a circuit configuration of a power conversion system of the present invention. A power conversion system 1 exemplarily illustrated in FIG. 1 performs AC-AC conversion of alternating current power that is input from a multi-phase AC power supply such as a three-phase AC power supply. In the example shown in FIG. 1, the power conversion system 1 outputs the converted alternating current power to charge a power load 2 such as a rechargeable battery mounted in a vehicle. The alternating current power, which is output from the power conversion system 1, is input to the vehicle side in a non-contact state via a transformer T and is converted into direct current power by an AC-DC conversion device on the vehicle side so as to be supplied to the power load 2. The AC-DC conversion device may be mounted in the vehicle or disposed outside the vehicle.

The power conversion system 1 includes a power conversion device 11 and a power supply control device 12. The power conversion device 11 is provided with a matrix converter 110 having a plurality of switching circuits and a resonant circuit 111 such as an LLC circuit or the like. The power supply control device 12 controls the power conversion device 11.

The matrix converter 110 exemplarily shown in FIG. 1 has six pairs of switching circuits. Each pair of switching circuits serves as a bidirectional switch. To each phase (i.e. R-phase, S-phase and T-phase) that is input from a three-phase AC power supply 10, two corresponding bidirectional switches as switching circuits are connected in parallel. Each bidirectional switch is constituted of: two switching elements; two diodes; and one capacitor (snubber capacitor) serving as a snubber element. Hereinafter, a switching circuit having switching elements S1 and S2 is described as an example. However, the other switching circuits having switching elements S3-S12 also have the same configuration.

The switching elements S1 and S2 are semiconductor switches not having reverse-conducting function. For the switching elements S1 and S2, elements such as an insulated gate bipolar transistor (IGBT) and a metal oxide semiconductor field effect transistor (MOSFET) are used. Since the two switching elements S1 and S2 are connected in anti-parallel to each other to form the switching circuit, the switching circuit serves as a bidirectional switch.

A capacitor C1 that serves as a snubber element is connected between collectors and emitters of the respective switching elements S1 and S2 connected in anti-parallel to each other.

Figure 4A:
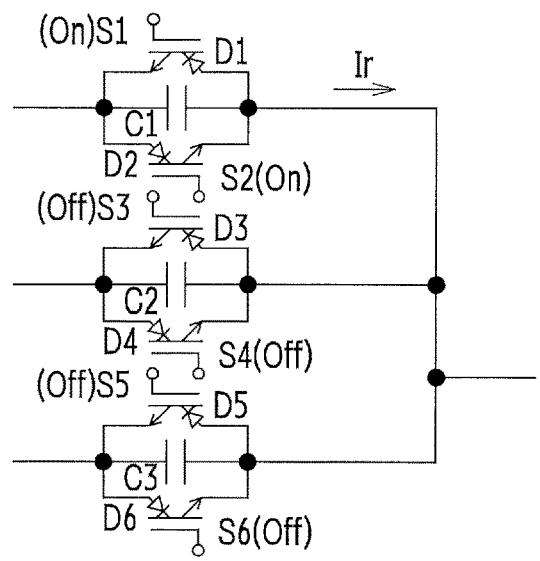
FIGS. 4A(a) to 4A(c) are time charts chronologically indicating operation states of the switching elements provided in the power conversion device in the power conversion system of the present invention.
Figure 4A:
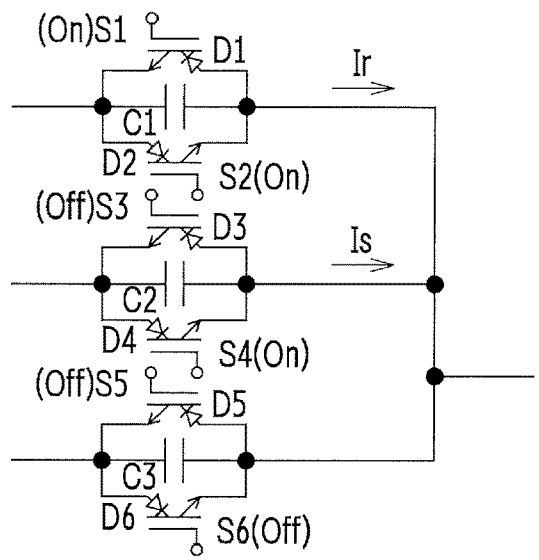
Figure 4A:
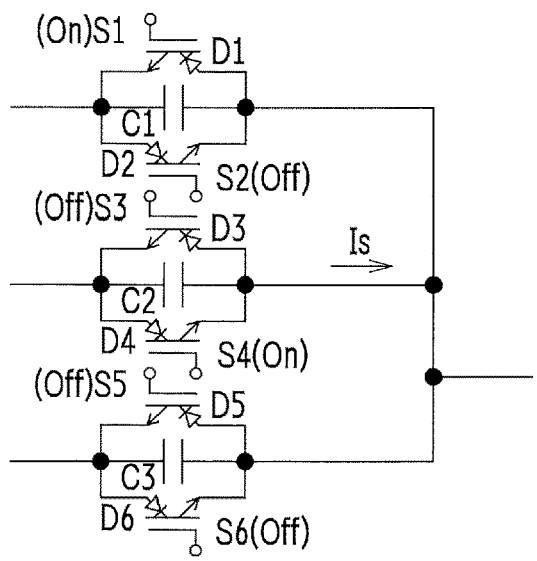

Also, between respective collectors and bases of the switching elements S1 and S2, diodes D1 and D2 (see, for example, FIGS. 4A(a) to 4A(c) and 4B(a) to 4B(b)) are connected.

Similarly to the above, each of the other switching circuits having the corresponding switching elements S3-S12 is also provided with a corresponding one of capacitors C2-C6 and diodes (see, for example, D3 to D6 illustrated in FIGS. 4A(a) to 4A(c) and 4B(a) to 4B(b)).

The matrix converter 110 having the above six pairs of switching circuits is connected for every phase to the three-phase AC power supply 10 such that an interphase voltage between any two phases of the three-phase AC power supply 10 is output by switching on and off the respective switching elements S1 to S12. Also, the output from the three-phase AC power supply 10, which is constituted of the R-phase, the S-phase and the T-phase, is branched to either of a U-phase formed using the switching elements S1 to S6 and a V-phase formed using the switching elements S7 to S12 according to the direction of the current flow. The switching on/off of each of the respective switching elements S1 to S12 is controlled by the power supply control device 12.

The resonant circuit 111 is an LLC circuit formed by a capacitor C111 and a coil L111 connected in series, and a primary coil Lt1 of the transformer T that is connected to the power load 2 in a non-contact state. The resonant frequency of the resonant circuit 111 is determined according to the frequency of the alternating current voltage that is output from the power conversion device 11. To a secondary coil Lt2 constituting the transformer T together with the primary coil Lt1, the power load 2 is connected via an AC-DC conversion device.

The power supply control device 12 includes various elements such as: an input voltage detection unit 120; a calculation unit 121; a pulse output unit 122; and an output voltage detection unit 123.

The input voltage detection unit 120 is a circuit that detects respective voltages of the phases input from the three-phase AC power supply 10. In the example shown in FIG. 1, the power conversion system 1 detects respective voltages er, es and et of the R-phase, the S-phase and the T-phase, and outputs the input voltage E and the phases θr, θs and θt to the calculation unit 121.

The calculation unit 121 derives, based on the input voltage detected by the input voltage detection unit 120 and an input default value of the input voltage phase, phase differences between the respective phases and frequencies based on the phase differences as target values for the power conversion device 11 to perform the conversion. Then, the calculation unit 121 outputs output values according to the phase differences and the frequencies to the pulse output unit 122 so as to control the matrix converter 110 to realize the derived phase differences and frequencies.

The pulse output unit 122 generates pulse wise modulation (PWM) signals based on the output values from the calculation unit 121 and outputs the generated PWM signals to the matrix converter 110 so as to control the respective switching elements S1 to S12 of the matrix converter 110.

The details of the calculation by the calculation unit 121 and the control of the switching elements S1 to S12 based on the calculation results will be described later.

The calculation unit 121 controls the entire power supply control device 12 so that the power supply control device 12 operates. The calculation unit 121 may be realized as hardware using a logic circuit such as VLSI and LSI, or may also be realized as a recording circuit such as a flash memory or a control circuit such as a CPU that executes a computer program recorded in the recording circuit. Furthermore, the above components may be combined as necessary. That is, the power supply control device 12 is configured, for example, as a control board on which a logic circuit is mounted, and as a computer that stores and executes a power control program for realizing the power supply control method of the present invention.

<Control Method>

Figure 2:
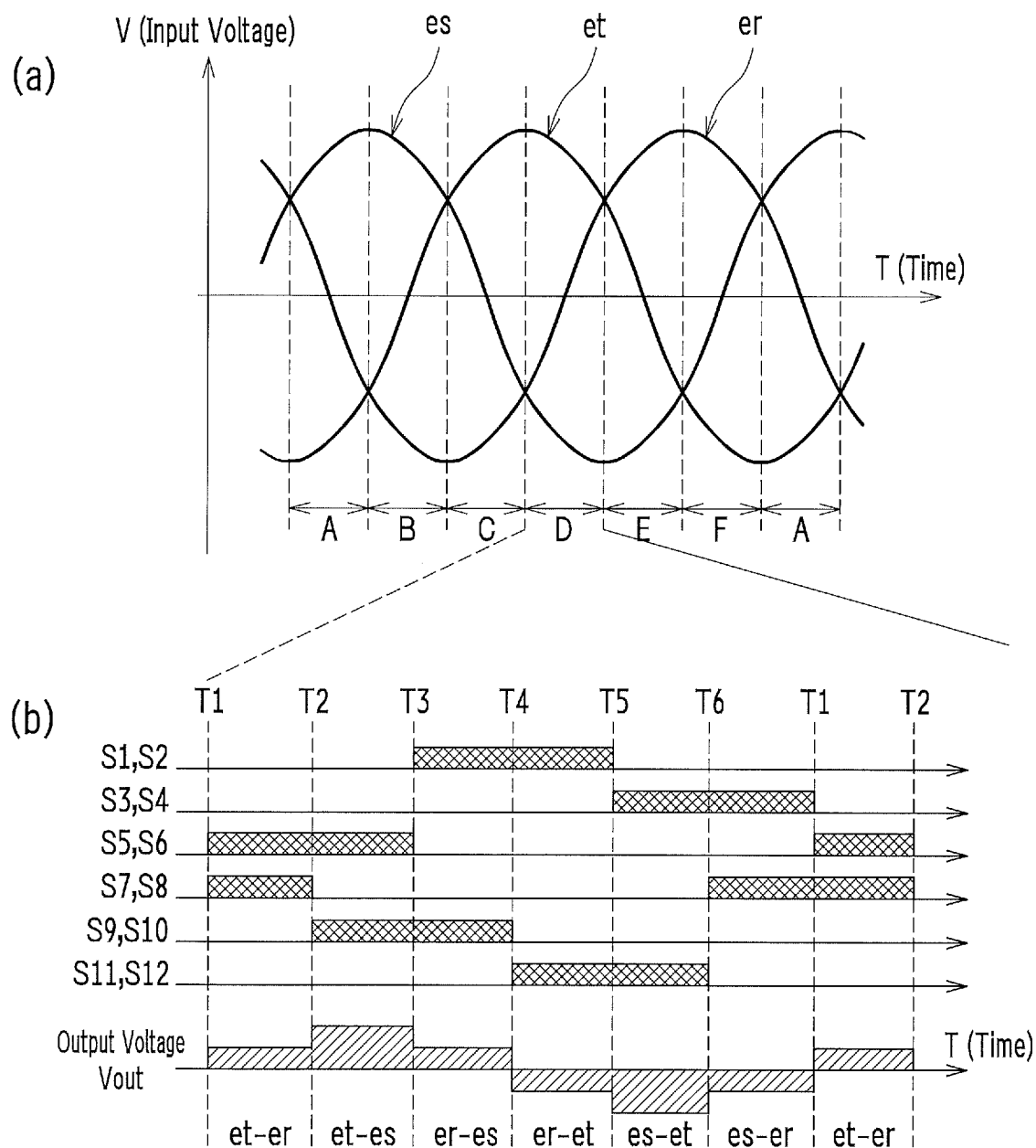
FIGS. 2(a) and 2(b) are explanation diagrams indicating voltage waveforms of a three-phase AC power supply and control patterns of switching elements in the power conversion system of the present invention.

FIGS. 2(a) and 2(b) are explanation diagrams indicating voltage waveforms of the three-phase AC power supply 10 and control patterns of the switching elements in the power conversion system 1 of the present invention. FIG. 2(a) indicates changes in the respective phase voltages over time. The phase voltages are output from three-phase AC power supply 10, and the graph is plotted with time as the horizontal axis and voltage value of the input voltage Vin as the vertical axis. Each phase of the voltage waveforms er, es and et is shifted from each other by $2/3\pi$ (120°). The power supply control device 12 controls the respective states of the six pairs of switching circuits (i.e. on/off state of the switching elements S1 to S12) of the power conversion device 11 using each control pattern corresponding to 6 sections classified by the magnitude relationship of the respective phase voltages (i.e. sections A to F in FIGS. 2(a) and 2(b)).

FIG. 2(b) indicates changes in the respective control patterns of the switching elements S1 to S12 and in the voltage value of the output voltage Vout over time. In the graph, the horizontal axis corresponds to conceptual time. Note that the time period from the time point T1 to the time point T6 as well as the next time period in the horizontal axis are equally divided, as conceptual time, into the respective intervals for the sake of explanation. However, the time intervals between the respective time points are not necessarily the same. The control patterns in FIG. 2(b) are the control patterns of the switching elements S1 to S12 at the interval D shown in FIG. 2(a). In the changes over time in the switching elements S1 to S12 shown in FIGS. 2(a) and 2(b), the intervals at which the switching elements is switched on are indicated with hatched lines.

The power supply control device 12 repeatedly performs switching on/off the switching elements S1 to S12. Thus, the interphase voltage that is output from the power conversion device 11 periodically changes as shown in FIGS. 2(a) and 2(b).

Figure 3:
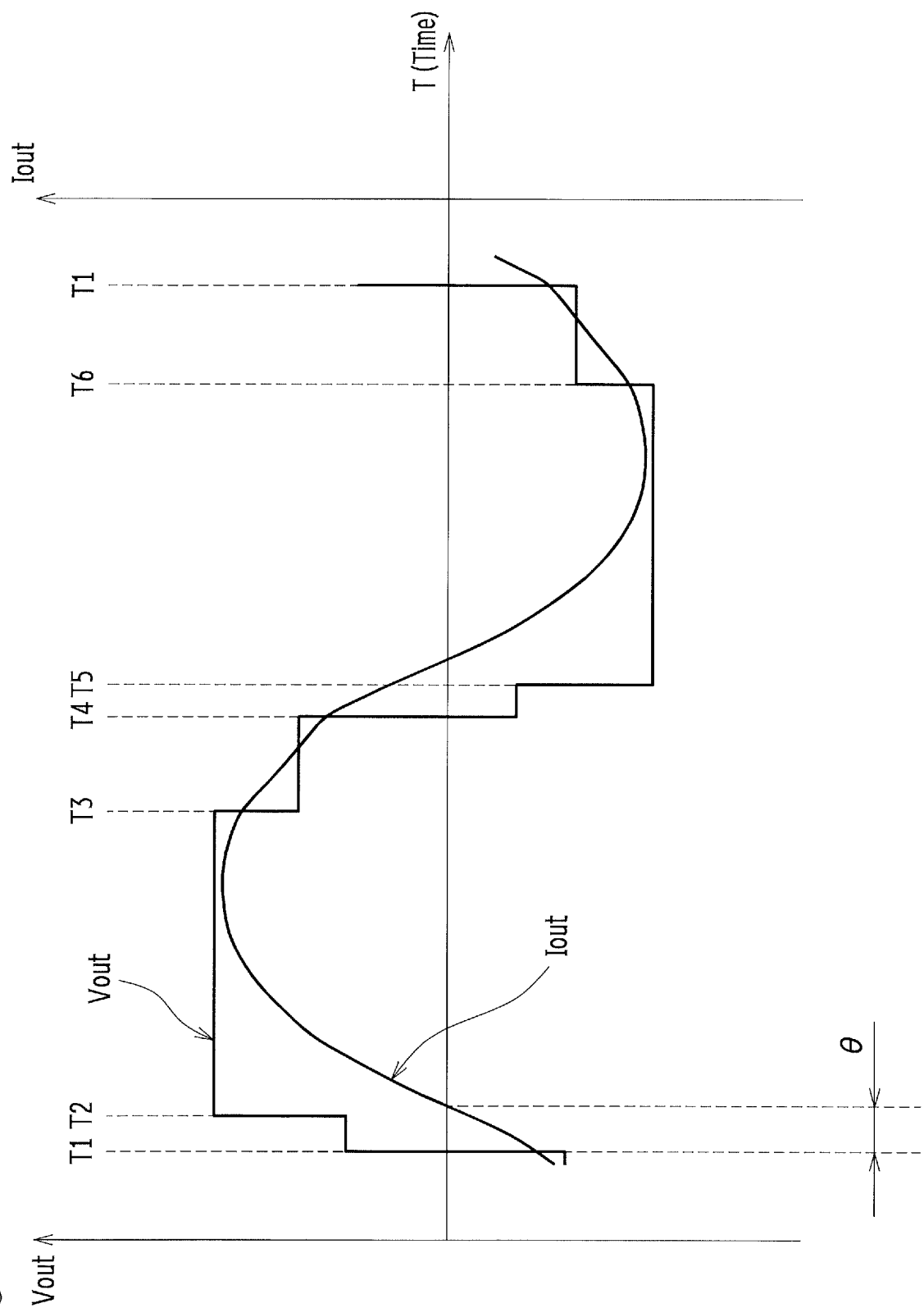
FIG. 3 is a graph chronologically indicating a relationship between an output voltage and an output current of a power conversion device in the power conversion system of the present invention.

FIG. 3 is a graph chronologically indicating a relationship between the output voltage and the output current of the power conversion device 11 in the power conversion system 1 of the present invention. FIG. 3 indicates changes in the output voltage Vout and in the output current Iout over time, with time as the horizontal axis, the output voltage Vout as the vertical axis on the left side and the output current Iout as the vertical axis on the right side. The output current Iout shows a U-phase current that is output from the switching circuits formed using the switching elements S1 to S6 in the power conversion device 11 to the power load 2, as exemplarily shown in FIG. 1. As shown in FIG. 3, the output voltage Vout is output as a staircase wave that shows a step-wise waveform. The output voltage Vout that is output as the staircase wave is inverted at the time point T1, and raised for the last time to reach the maximum value at the time point T2. Then, the output voltage Vout is dropped step by step from the time point T3 to the time point T5. The output voltage Vout is inverted at the time point T4 and reaches the minimum value at the time point T5 (i.e. falling for the last time). Since the power conversion device 11 includes the resonant circuit 111, the phase of the output current Iout is delayed by the time corresponding to the phase θ compared to the phase of the output voltage Vout. In the present invention, the time point T1 at which the voltage is inverted from negative to positive is used as a reference to define the phase.

FIGS. 4A(a) to 4A(c) and 4B(a) to 4B(b) are time charts chronologically indicating operation states of the switching elements S1 to S6 that are provided in the power conversion device 11 in the power conversion system 1 of the present invention. The switching circuits shown in FIGS. 4A(a) to 4A(c) and 4B(a) to 4B(b) include: the switching elements S1 to S6; the snubber capacitors C1 to C3; and the diodes D1 to D6. FIG. 5 is a graph chronologically indicating respective states of the switching elements S1 to S4 provided in the power conversion device 11, the output voltages and the output currents in the power conversion system 1 of the present invention. In FIGS. 4A(a) to 4A(c), 4B(a) to 4B(b) and 5, control states after the time point T5 at which the R-phase is switched to the S-phase as shown in FIGS. 2(a), 2(b), and 3 are indicated, by further dividing the time period into intervals by time points t1 to t4. In FIGS. 4A(a) to 4A(c) and 4B(a) to 4B(b), the switching elements are switched in the order of FIG. 4A(a), FIG. 4A(b), FIG. 4A(c), FIG. 4B(a), and FIG. 4B(b). Vcr in FIG. 5 is a voltage between both ends of the capacitor C1 that is connected between the collectors and the emitters of the respective switching elements S1 and S2. Vcs is a voltage between both ends of the capacitor C2 that is connected between the collectors and the emitters of the respective switching elements S3 and S4. Ir is a current that flows through the R-phase while Is is a current that flows through the S-phase. Actually, the current that flows through the R-phase or the S-phase is not constant and fluctuates even when the state of the switching is not changed. However, for the sake of easy comprehension, the current is conceptually shown in FIG. 5, which is considered as constant when it flows and furthermore the switching is not changed.

First, at the time point t1 immediately after the time point T5 shown in FIGS. 2(a), 2(b), and 3, the power supply control device 12 switches the switching element S4 from the off state to the on state (from FIG. 4A(a) to FIG. 4A(b)). At the time of switching the state of the switching element S4, the current does not flow through the S phase (i.e. Is =0). Thus, the state of the switching element S4 is switched at the time point t1 in zero current sequence (ZCS). Namely, the switching of the state of the switching element S4 at the time point t1 is soft switching.

Next, the power supply control device 12 switches the switching element S2 from the on state to the off state at the time point t2 (from FIG. 4A(b) to FIG. 4A(c)). At the time of switching the state of the switching element S2, the voltage between both ends of the capacitor C1 is 0V. Thus, the state of the switching element S2 is switched at the time point t2 in zero voltage sequence (ZVS). Namely, the switching of the state of the switching element S2 at the time point t2 is soft switching. Furthermore, since the switching element S2 is switched to the off state, charge of the capacitor C1 is started and the S-phase current Is is started to flow. Immediately after the time point t2 at which the switching element S2 is switched, the current flows temporarily through both phases due to connection of the capacitor C1 that is started to be charged. Therefore, as shown in FIG. 5, in the period immediately after the time point t2, the current is divided into the R-phase current Ir and the S-phase current Is until the charge of the capacitor C1 and the discharge of the capacitor C2 are terminated.

Figure 4B:
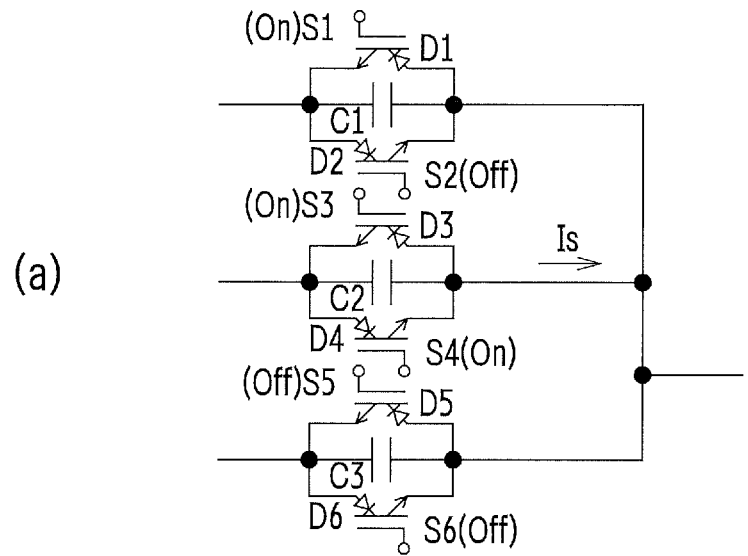
FIGS. 4B(a) and 4B(b) are time charts chronologically indicating operation states of the switching elements provided in the power conversion device in the power conversion system of the present invention.
Figure 4B:
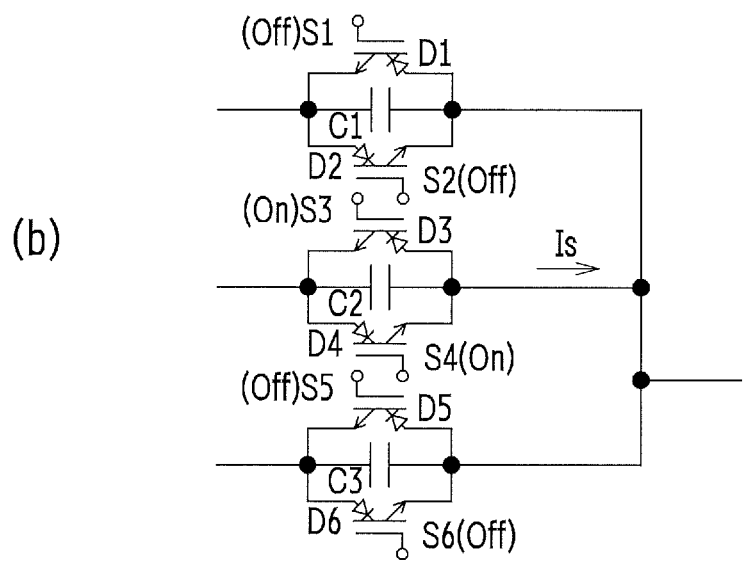
Figure 5:
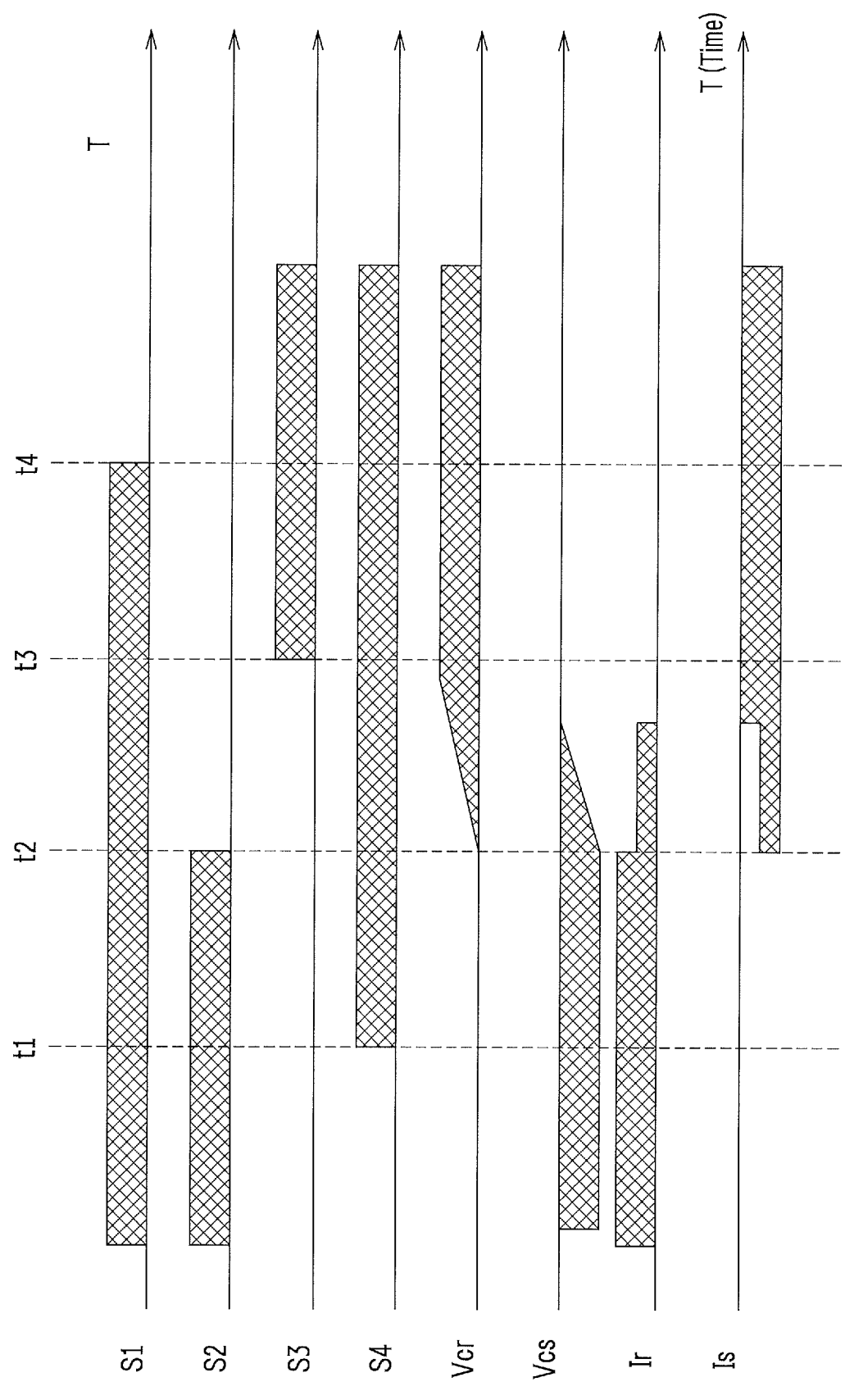
FIG. 5 is a graph chronologically indicating respective states of the switching elements provided in the power conversion device, the output voltages and the output currents in the power conversion system of the present invention.

The power supply control device 12 switches the switching element S3 from the off state to the on state at the time point t3 (from FIG. 4A(c) to FIG. 4B(a)). At the time of switching the state of the switching element S3, the voltage between both ends of the capacitor C2 is 0V. Thus, the state of the switching element S3 is switched at the time point t3 in zero voltage sequence (ZVS). Namely, the switching of the state of the switching element S3 at the time point t3 is soft switching.

Description will be given later on the relations of each capacitance of the capacitors C1 to C6, the resonant frequency of the resonant circuit 111 and the size of the power load 2.

The power supply control device 12 switches the switching element S1 from the on state to the off state at the time point t4 (from FIG. 4B(a) to FIG. 4B(b)). At the time of switching the state of the switching element S1, the current does not flow through the R phase (i.e. Ir=0). Thus, the state of the switching element S4 is switched at the time point t4 in zero current sequence (ZCS). Namely, the switching of the state of the switching element S1 at the time point t4 is soft switching.

As described above, regarding commutation operations by the power conversion device 11, all the switching of the respective states of the switching elements S1 to S12 is soft switching, not hard switching. To such a power conversion device 11, for example, the technique described in detail in JP 2015-149857 A can be applied.

<Control and Various Calculations>

Here, description will be given on a control method and various calculations therefor in order to increase power factor while achieving the soft switching in the power conversion system 1 of the present invention by dynamically optimizing the output frequency from the power conversion device 11 according to the power load 2. More specifically, the method for controlling the power conversion device 11 by the power supply control device 12 is described, in which the optimal phase difference between the output voltage and the output current in the soft switching by the power conversion system 1 is derived so as to reach the derived phase difference.

In order to optimize the output frequency relative to the power load 2 and to increase the power factor as possible while achieving the soft switching, the output frequency is controlled so as to meet the following conditions 1 and 2, and furthermore the condition 3.

Condition 1: during increase of the absolute value of the output voltage, the output current has a reverse polarity of the output voltage, in other words, meets either of the following conditions:
condition 1.1: the output current iuv<0 when the output voltage increases; or
condition 1.2: the output current iuv>0 when the output voltage decreases.

Condition 2: within the period in which the snubber element is discharged, the polarity of the output current does not change.

Condition 3: in addition to satisfaction of the above conditions 1 and 2, the phase difference between the output voltage and the output current is minimized.

Figure 6:
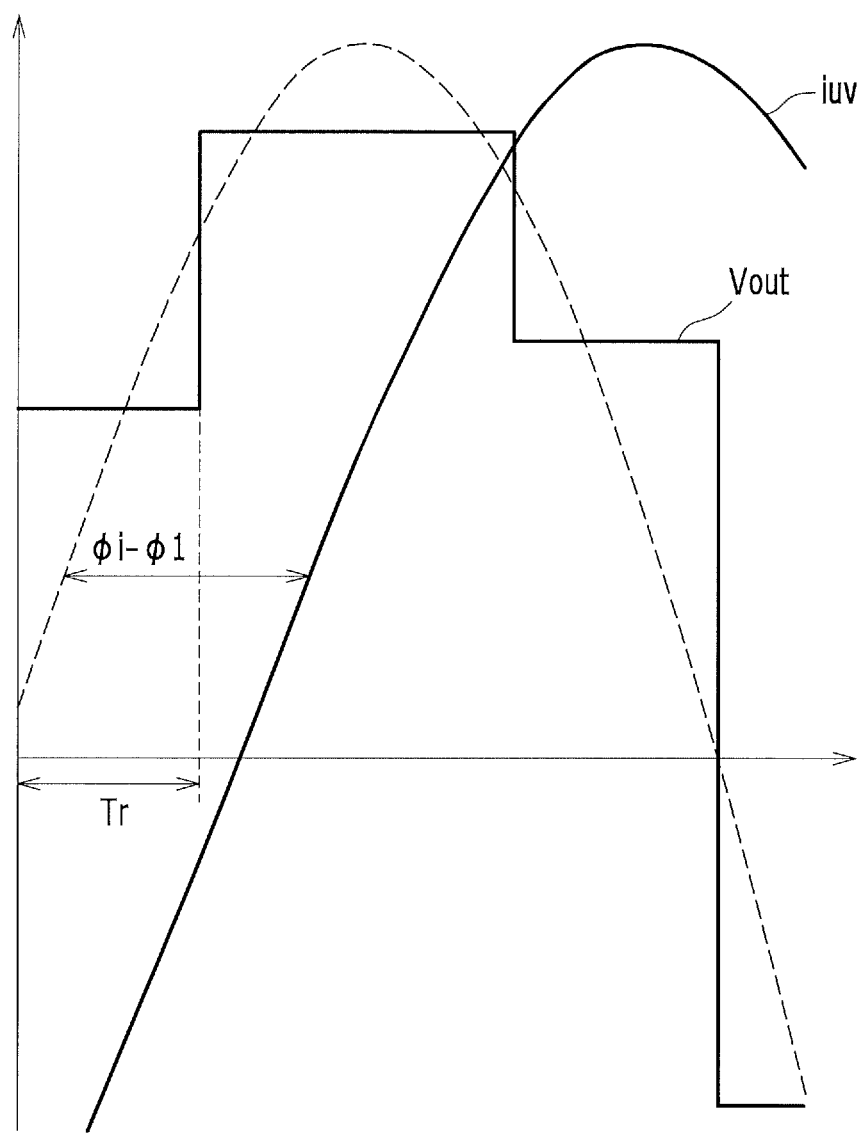
FIG. 6 is a graph schematically indicating output waveforms from the power conversion device provided in the power conversion system of the present invention.

The condition 1 is described. FIG. 6 is a graph schematically indicating an output waveform from the power conversion device 11 provided in the power conversion system 1 of the present invention. In FIG. 6, changes in the waveforms of the output voltage and the output current are plotted with phase as the horizontal axis and output value as the vertical axis. In FIG. 6, the solid line that shows a step-wise wave represents a staircase waveform of the output voltage that is output from the power conversion device 11. The broken line that shows a sine wave represents a fundamental wave of the output voltage. The fundamental wave is a waveform of the output voltage that is made by removing the higher order component from the staircase waveform of the output voltage that is output from the power conversion device 11. Furthermore, the sine wave indicated by the solid line represents a waveform of the output current that is output from the power conversion device 11. Here, the current that flows from the U phase to the V phase is indicated as the output current.

As shown in FIG. 6, in the period Tr in which: the output voltage that is output as the step-wise wave is positive; and the time point at which the value of the output voltage is raised and increased is included, the condition iuv<0 is satisfied, where iuv represents the output current indicated by the solid line.

Figure 7:
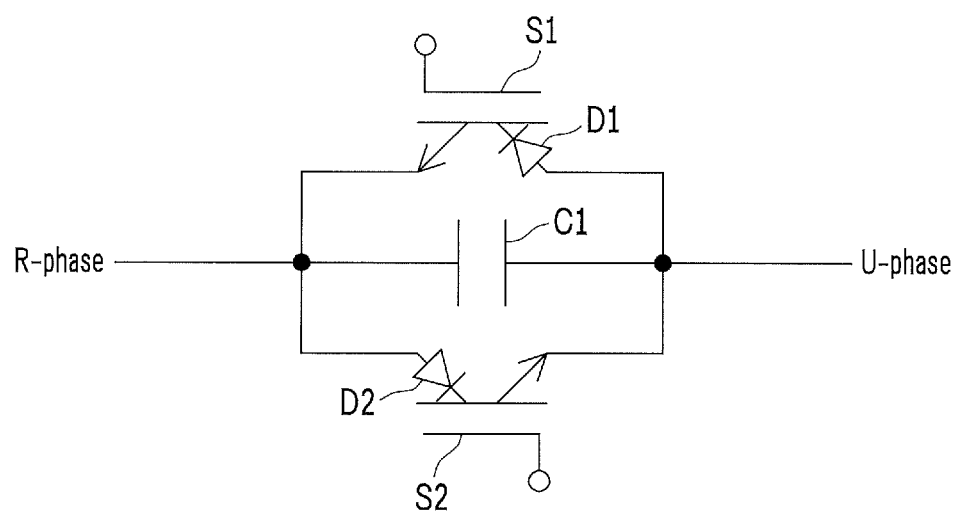
FIG. 7 is a circuit diagram illustrating an example of a switching circuit of the power conversion device provided in the power conversion system of the present invention.

The condition 2 is described. FIG. 7 is a circuit diagram illustrating an example of a switching circuit of the power conversion device 11 provided in the power conversion system 1 of the present invention. The switching circuit indicated in FIG. 7 is a bidirectional switch in which the two switching elements S1 and S2 are connected in anti-parallel to each other. The capacitor (snubber capacitor) C1 that serves as a snubber element is connected between the emitters and the collectors of the switching elements S1 and S2 connected in anti-parallel to each other. Also, the diode D1 is connected between the collector and the base of the switching element S1 while the diode D2 is connected between the collector and the base of the switching element S2. The diodes D1 and D2 each serve as a backflow prevention element. The left side of FIG. 7 is a side of the three-phase AC power supply 10 that is the R-phase while the right side thereof is a side of the power load 2 that is the U-phase. The snubber capacitor C1 reduces abrupt voltage change at both ends of the switching circuit by being charged and discharged during the commutation. That is, in the condition that Vru (potential difference between the R-phase and the U-phase) is positive (i.e. Vru>0) in FIG. 7, the snubber element is charged when the current iu that flows from the three-phase AC power supply 10 to the power load 2 is positive (i.e. iu>0), and the snubber element is discharged when the current iu is negative (i.e. iu<0).

Figure 8:
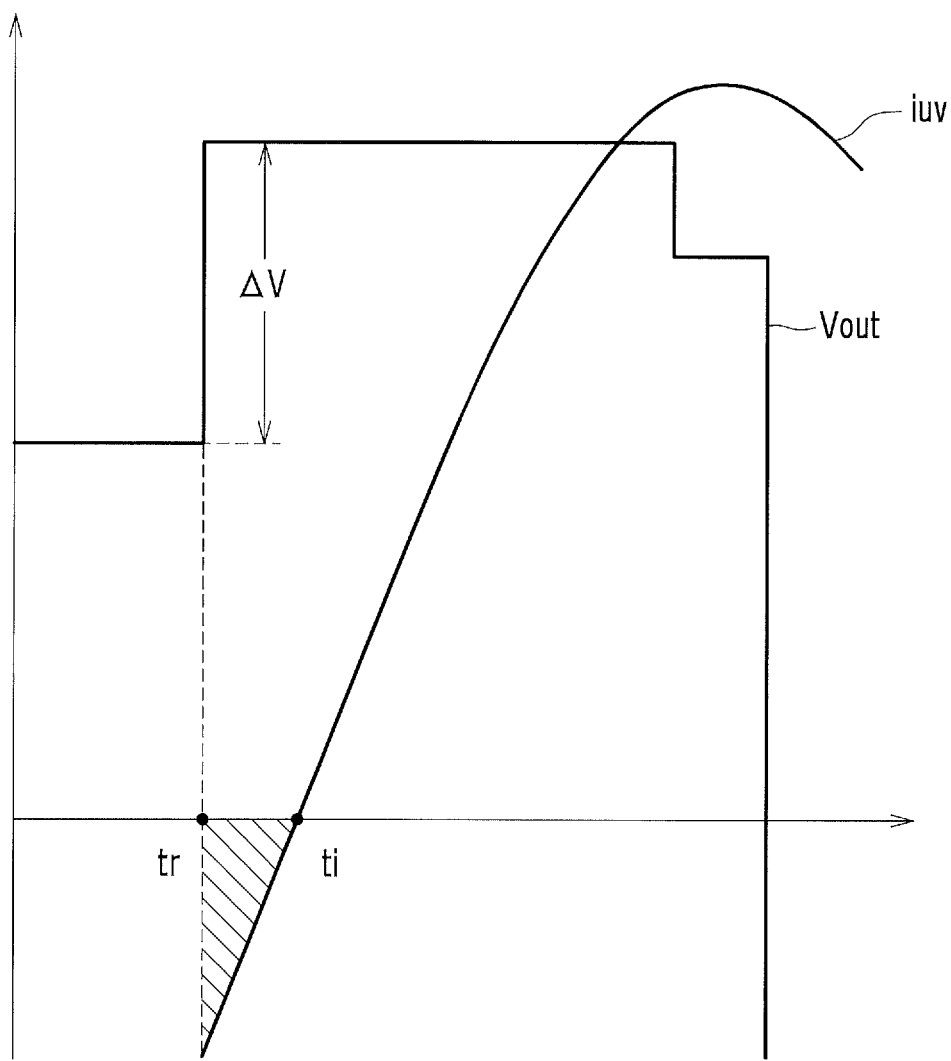
FIG. 8 is a graph schematically indicating output waveforms from the power conversion device provided in the power conversion system of the present invention.

FIG. 8 is a graph schematically indicating the output waveform from the power conversion device 11 provided in the power conversion system 1 of the present invention. In FIG. 8, changes in the waveforms of the output voltage and the output current are plotted with time as the horizontal axis and output value as the vertical axis. In FIG. 8, the step-wise wave represents a waveform of the output voltage Vout that is output from the power conversion device 11. The sine wave represents a waveform of the output current iuv that is output from power conversion device 11. As described above, the snubber element reduces abrupt voltage change at both ends of the switching circuit by being charged and discharged at the time of commutation. Therefore, it is necessary to perform control not to change the direction (polarity) of the output current iuv that flows through the switching circuit until the snubber element is completely discharged. That is, the above condition 2 "within the period in which the snubber element is discharged, the polarity of the output current does not change" should be satisfied. In FIG. 8, the discharge should be completed before the output current iuv is inverted from negative to positive, i.e. before the time elapses from the time point tr to the time point ti. Thus, taking into account the period necessary for the snubber element to be discharged, it is needed to control not to change the polarity of the output current within the above period.

After the time point tr in FIG. 8, at which the absolute value of the output voltage reaches the maximum value, the time lag between the commutation and the polarity change of the current decreases. Thus, the control should be accurately performed in consideration of the capacitance of the snubber element. Specifically, it is necessary to perform the control so as to satisfy the condition expressed by the following Formula (1). The time point at which the absolute value of the output voltage reaches the maximum value means, more specifically, the time point at which the output voltage as the step-wise wave is raised at the last time out of a plurality of risings within the period in which the output voltage changes from the local minimum value to the local maximum value. For example, it is the time point T2 shown in FIG. 3. When the output voltage changes from the local maximum value to the local minimum value, the time point at which the absolute value of the output voltage reaches the maximum value means the time point at which the output voltage is dropped at the last time, i.e. the last falling. For example, it is the time point T5 shown in FIG. 3.

$$2C \cdot \Delta V < |\int_{t_r}^{t_i} i \, dt| \quad \text{(Formula (1))}$$

wherein C represents the capacitance of the snubber element (snubber capacitor), $\Delta V$ represents the change in the output voltage, tr represents the time point at which the absolute value of the output voltage reaches the maximum value (i.e. the time point of the last rising of the output voltage), ti represents the time point at which the polarity of the output current changes, and i represents the output current.

Figure 9:
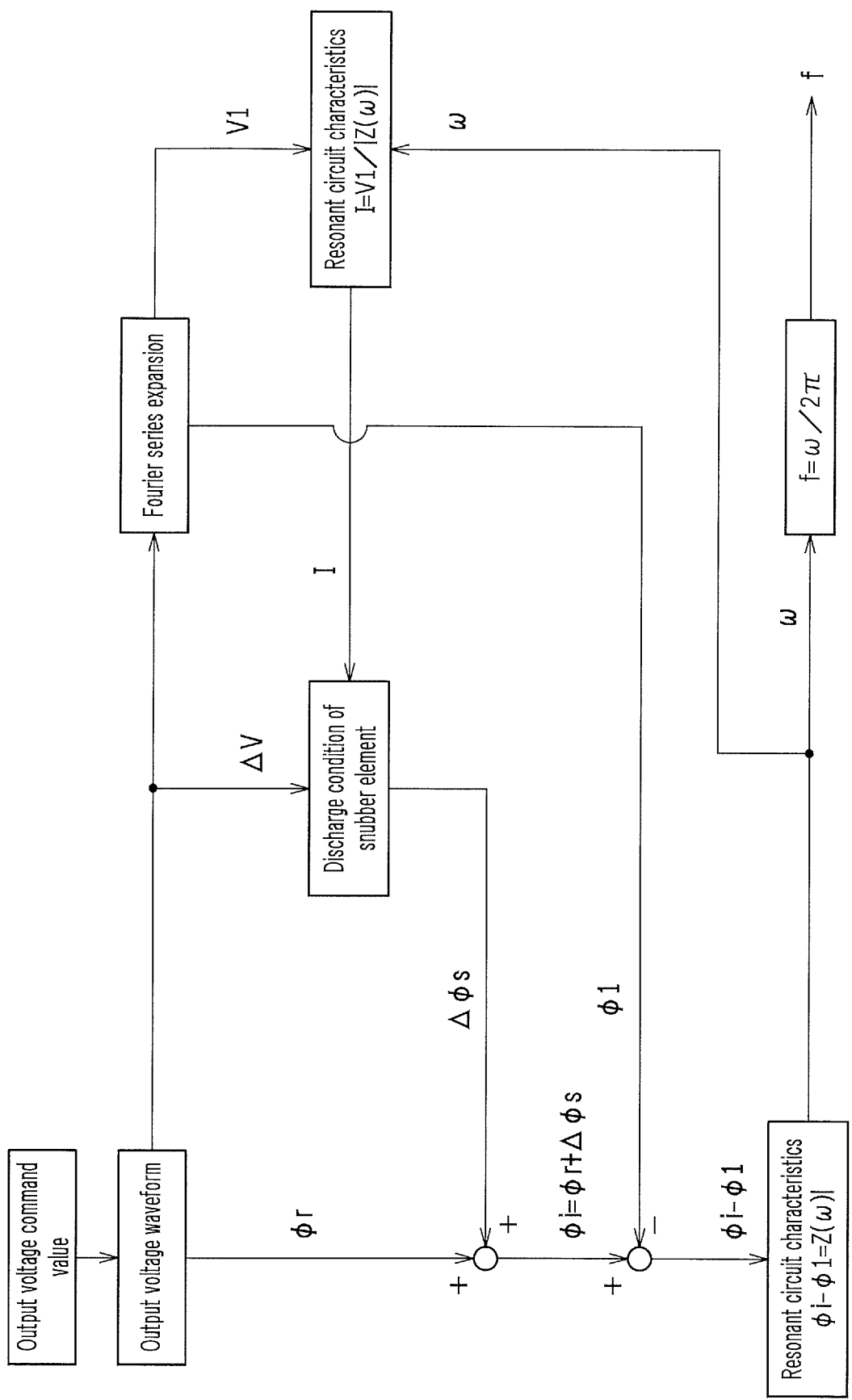
FIG. 9 is a block diagram conceptually indicating processing in a power supply control device of the present invention.

FIG. 9 is a block diagram schematically indicating processing in the power supply control device 12 of the present invention. In FIG. 9, calculations required to meet the conditions 1, 2, and 3 as described above are shown as a block diagram. The power supply control device 12 reads an output voltage command value that is input or set so as to create an output voltage waveform (staircase waveform) that is a step-wise output wave.

The calculation unit 121 of the power supply control device 12 processes the created output voltage waveform by Fourier series expansion, and derives, based on the results, a phase $\varphi 1$ of the fundamental wave of the output voltage and an amplitude V1 of the fundamental wave of the output voltage.

The calculation unit 121 derives the magnitude I of the output current by the following Formula (2) using the amplitude V1 of the fundamental wave of the output voltage and an impedance Z of the resonant circuit 111. The impedance Z is set by feeding back an angular frequency $\omega$ derived from a phase difference ($\varphi i - \varphi 1$) obtained by a method described below.

$$I = V1/|Z| \quad \text{(Formula (2))}$$

wherein I represents the magnitude of the output current, V1 represents the amplitude of the fundamental wave of the output voltage, and Z represents the impedance.

The calculation unit 121 derives a phase difference $\Delta \varphi s$ as the condition 2 for the capacitance C and the like of the snubber element, which is necessary for discharge, from the above-described Formula (1) using: the change $\Delta V$ in the output voltage at the time point at which the absolute value of the output voltage derived from the formed output voltage waveform reaches the maximum value (i.e. at the time point of the last rising of the output voltage); and the magnitude I of the derived output current. The phase difference $\Delta \varphi s$ corresponds to ti to tr shown in FIG. 8.

The calculation unit 121 derives the optimal current phase $\varphi i$ ($\varphi i = \varphi r + \Delta \varphi s$) by adding the derived phase difference $\Delta \varphi s$ necessary for discharge to the phase $\varphi r$ at the time point at which the absolute value of the output voltage derived from the created output voltage waveform reaches the maximum value (i.e. at the time point of the last rising of the output voltage).

The calculation unit 121 derives the phase difference ($\varphi i - \varphi 1$) of the optimal output current by subtracting the phase $\varphi 1$ of the fundamental wave of the output voltage obtained by Fourier series expansion from the derived optimal voltage phase $\varphi i$.

The calculation unit 121 derives the impedance Z ($\omega$) of the resonant circuit 111 based on the derived phase difference ($\varphi i - \varphi 1$) of the optimal output current (i.e. $\varphi i - \varphi 1 = Z(\omega)$), and furthermore derives the angular frequency $\omega$. The derived angular frequency $\omega$ is fed back in order to derive the magnitude I of the output current. The calculation unit 121 also derives the optimal output frequency f from the derived angular frequency $\omega$.

Furthermore, the calculation unit 121 outputs the output value to the pulse output unit 122 so as to perform control to realize the output frequency f based on the phase difference ($\varphi i - \varphi 1$). The pulse output unit 122 controls the matrix converter 110 of the power conversion device 11 based on the output value that is output from the calculation unit 121.

In the above-described calculation processing, now description will be given on the Fourier series expansion when the calculation unit 121 derives the respective components of the fundamental wave. The formula of the Fourier series expansion of the periodic function vout based on the output voltage waveform is expressed as the following Formula (3):

$$v_{out} = a_0 + \Sigma a_n \cos(n\omega t) + b_0 + \Sigma b_n \sin(n\omega t) = V_0 + \Sigma V_n \sin(n\omega t + \varphi_n) \text{ (wherein } n=0, 1, 2 \ldots \text{)};$$

$$\therefore V_n = (a_n^2 + b_n^2)^{1/2}, \text{ and } \varphi_1 = \tan(a_1/b_1) \quad \text{(Formula (3))}.$$

In the above formula, $\omega$ represents the angular frequency of vout. Also in the above formula, the component n=1 represents the component of the above-described fundamental wave. Thus, the fundamental wave is expressed by the following Formula (4) using this component:

$$V1 \sin(\omega t + \varphi 1) \quad \text{(Formula (4))}.$$

Furthermore, each component of the fundamental wave shown in Formula (4) is expressed by the following Formula (5) using a period T of vout:

$$a_1 = \frac{2}{T} \int_0^T v_{out} \cos(\omega t) dt, \quad \text{(Formula (5))}$$

$$b_1 = \frac{2}{T} \int_0^T v_{out} \sin(\omega t) dt$$

$$V_1 = \sqrt{a_1^2 + b_1^2},$$

$$\phi_1 = \tan(a_1/b_1).$$

In this way, the calculation unit 121 performs the Fourier series expansion so as to derive the components (such as the amplitude V1 and the phase $\varphi 1$) of the fundamental wave based on the output voltage waveform. The thus derived components of the fundamental wave are used in the respective calculations.

In the above-described calculation processing, now description will be given on processing of the calculation unit 121 to derive the phase difference $\Delta \varphi s$ necessary for discharge of the snubber capacitor that is used as a snubber element.

As described above as the condition 2 using Formula (1), the snubber element should be completely discharged before the polarity of the output current changes, for example, the output current is inverted from negative to positive.

Figure 10:
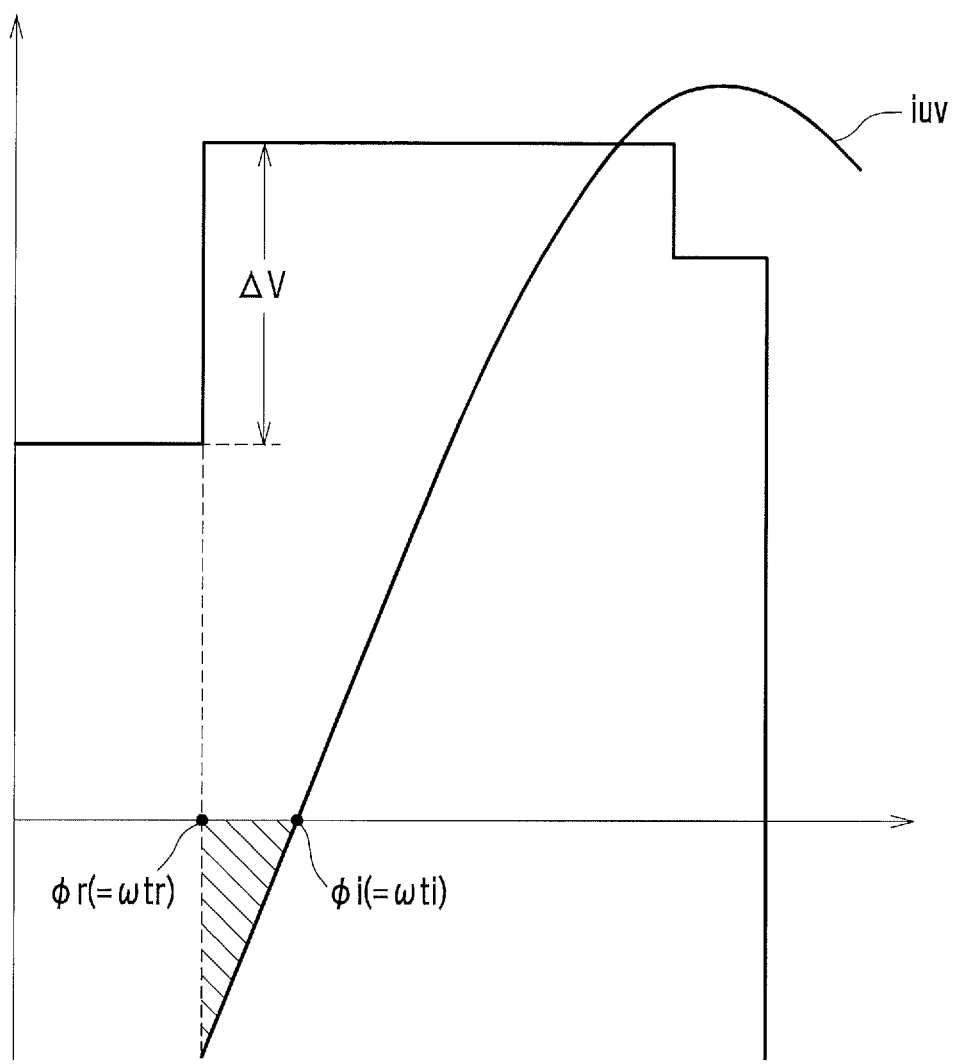
FIG. 10 is a graph schematically indicating output waveforms from the power conversion device provided in the power conversion system of the present invention.

FIG. 10 is a graph schematically indicating the output waveform from the power conversion device 11 provided in the power conversion system 1 of the present invention. In FIG. 10, changes in the waveforms of the output voltage and the output current are plotted with phase as the horizontal axis and output value as the vertical axis. The output current i in FIG. 10 is expressed by the following Formula (6):

$$i = iuv = I \sin(\omega t - \varphi i) \quad \text{(Formula (6))}.$$

The following Formula (7) is obtained by solving the above Formula (6):

$$\varphi i - \varphi r > \cos^{-1}(1 - 2\omega C \Delta V/I) \quad \text{(Formula (7))}.$$

The calculation unit 121 derives, using Formula (7), the phase difference $\Delta\varphi s (=\varphi i - \varphi r)$ necessary for discharge of the snubber capacitor that is used as a snubber element.

Figure 11:
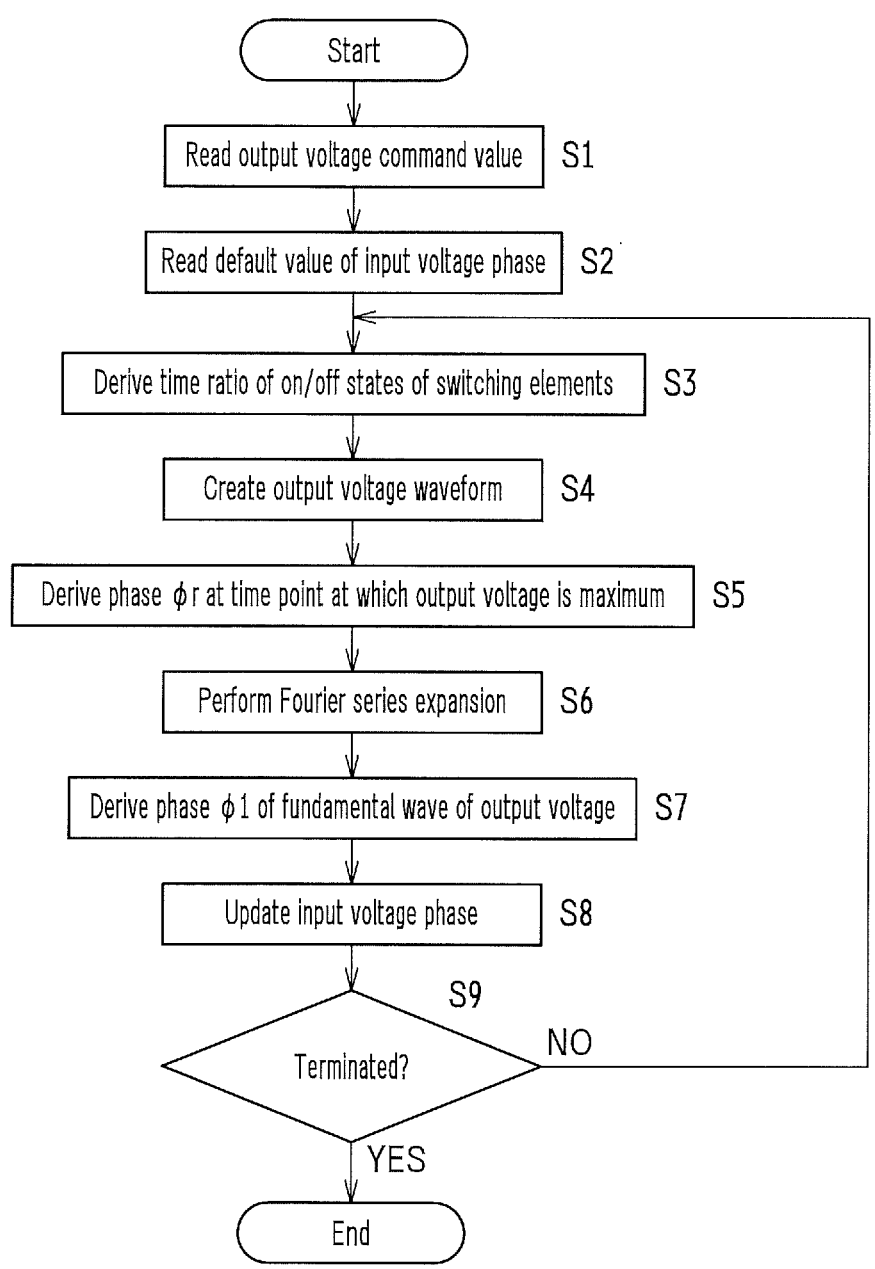
FIG. 11 is a flowchart indicating an example of a phase calculation process executed by the power conversion device provided in the power conversion system of the present invention.

In the calculation processing, now description will further be given on specific processing of the calculation unit 121 to derive: the phase $\varphi r$ at the time point at which the absolute value of the output voltage derived from the output voltage waveform reaches the maximum value; and the phase $\varphi 1$ of the fundamental wave of the output voltage obtained by the Fourier series expansion. FIG. 11 is a flowchart indicating an example of a phase calculation process executed by the power conversion device 11 provided in the power conversion system 1 of the present invention.

The calculation unit 121 of the power conversion device 11 reads the output voltage command value that is input or set (step S1), and furthermore reads the default value, which is set in advance, of the input voltage phase (step S2). In the reading processing in steps S1 and S2, the value stored in advance as a set value may be read, or the value input from outside may be read.

The calculation unit 121 derives, based on the thus-read output voltage command value and the default value of the input voltage phase, the time ratio of On/Off states of each of the switching elements (i.e. switching time ratio) of the switching circuits provided in the matrix converter 110 (step S3).

Based on the thus-read output voltage command value and the thus-derived switching time ratio, the calculation unit 121 creates the output voltage waveform (staircase waveform) that is to output from the power conversion device 11 as the step-wise wave (step S4).

Based on the thus-created output voltage waveform, the calculation unit 121 derives the phase $\varphi r$ when the absolute value of the output voltage reaches the maximum value (step S5). Also, the calculation unit 121 performs the Fourier series expansion to the thus-created voltage waveform (step S6), thus derives the phase $\varphi 1$ of the fundamental wave of the output voltage (step S7).

Then the calculation unit 121 updates the phase of the input voltage that is the target value of the calculation (step S8), and determines whether the calculation should be terminated (step S9). In step S9, when it is determined that the calculation should not be terminated (step S9: NO), the operation of the calculation unit 121 returns to step S3 and repeats the processing thereafter. In step S9, when it is determined that the calculation should be terminated (step S9: YES), the control unit terminates the phase calculation process. The condition for determination of termination in step S9 is appropriately set according to specification of the system. For example, when the difference between the default value and the final value of the input voltage phase converges to a predetermined value or less, it is determined that the calculation should be terminated.

The phase calculation process is executed as described above.

As described in detail above, the power conversion system 1 of the present invention performs calculation, according to the output voltage command value, such that the solution asymptotically converges using the recursive algorithm in which the processes such as derivation of the switching time ratio, creation of the output voltage waveform, and derivation of the output frequency are repeatedly performed, as conceptually shown in the block diagram of FIG. 9 and the flowchart of FIG. 11. Thus, the control is performed based on the solution obtained by the calculation, i.e. the above-described condition 1 (conditions 1.1 and 1.2), condition 2 and condition 3. Accordingly, the frequency f according to the output from the power conversion device 11 is dynamically optimized, and the soft switching can be performed in a state in which the power factor is 1 or as close to 1 as possible.

<Experiment Results>

Figure 12:
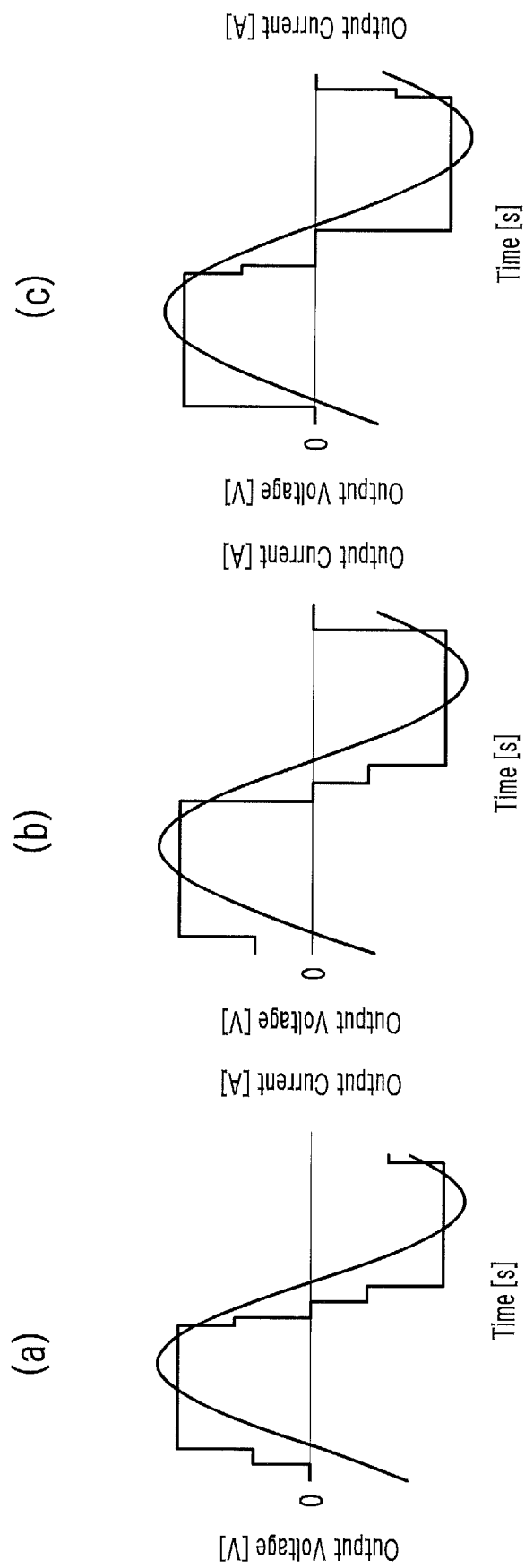
FIGS. 12(a) to 12(c) are graphs indicating experiment results on the output voltage and the output current that are output from the power conversion device according to control performed by the power supply control device in the power conversion system of the present invention.

Here, experiment results will be described, which were obtained by the experiments in which the output of the power conversion device 11 controlled by the power supply control device 12 was tested in the power conversion system 1 of the present invention. FIGS. 12(*a*), 12(*b*), and 12(*c*) are graphs indicating experiment results on the output voltage and the output current output from the power conversion device 11 according to control performed by the power supply control device 12 in the power conversion system 1 of the present invention. FIGS. 12(*a*), 12(*b*), and 12(*c*) are graphs that indicate changes in the output voltage and the output current over time with phase as the horizontal axis and output value as the vertical axis. More specifically, FIGS. 12(*a*), 12(*b*), and 12(*c*) indicate the respective states of the waveforms of the output currents relative to the respective output voltages having various staircase waveforms created by respectively changing the switching time ratio.

As can be seen from FIGS. 12(*a*), 12(*b*), and 12(*c*), no matter what the specific form of the staircase waveform of the output voltage was, the output current followed the corresponding waveform of the output voltage. Thus, the optimal phase control was performed. Furthermore, in any of the experiments, the above conditions 1 to 3 were satisfied. Specifically, the following conditions were met: during increase of the absolute value of the output voltage, the output current has the reverse polarity of the output current; within the period in which the snubber element is discharged, the polarity of the output current does not change; and under the above conditions, the output voltage and the output current are minimized.

The present invention should not be limited by the foregoing embodiments, and may be embodied in other forms without departing from the gist or essential characteristics thereof. Therefore, the embodiments described herein are to be considered in all respects as illustrative and not limiting. The technical scope of the present invention is indicated by the appended claims rather than by the foregoing embodiments, and all modifications and changes that come within the meaning and range of equivalency of the claims are intended to be embraced therein.

For example, in the above embodiment, the aspect in which the alternating current power that is output from the power conversion system 1 is converted into the direct current power is exemplarily described. However, it is possible to use the alternating current power without converting into the direct current power.

Furthermore, the switching circuit that is used in the matrix converter 110 in the power conversion device 11 may have another circuit configuration provided that it is a bidirectional switch. For example, it is possible to use a bidirectional switch having a circuit configuration in which two switching elements, to which respective diodes serving as free-wheeling diodes are connected in anti-parallel to each other, are reversely connected in series, and a snubber capacitor is connected in parallel with the switching element connected in series.

Also, the power conversion system 1 may be appropriately designed, for example, to cause the output voltage detection unit 123 to detect the voltage applied to the power load 2 as the output destination so as to perform feedback control.

DESCRIPTION OF REFERENCE NUMERALS

1 Power conversion system
10 Multi-phase AC power supply (three-phase AC power supply)
11 Power conversion device
110 Matrix converter
111 Resonant circuit (LLC circuit)
C1-C6 Snubber capacitor (snubber element)
S1-S12 Switching element
12 Power supply control device
120 Input voltage detection unit
121 Calculation unit
122 Pulse output unit
123 Output voltage detection unit
2 Power load

The invention claimed is:

1. A power supply control device configured to control a power conversion device including a plurality of switching circuits that is connected to a multi-phase AC power supply for every phase and that each has a snubber element capable of being charged and discharged, the power conversion device being configured to: perform AC-AC conversion of input from the multi-phase AC power supply by the plurality of switching circuits; and output the converted AC power via a resonant circuit, the power supply control device comprising:
 a calculation unit that performs operations comprising:
  creating a staircase waveform of an output voltage that is output from the power conversion device;
  deriving a phase difference between a phase of a fundamental wave of the output voltage that is output from the power conversion device and a phase of an output current based on: the phase of the fundamental wave of the output voltage according to the staircase waveform created by the calculation unit; a rising phase that is a phase when an absolute value of the output voltage indicated by the staircase waveform created by the calculation unit reaches a maximum value; and a discharge phase difference based on a period necessary for discharge of the snubber element; and
  deriving a frequency to obtain the phase difference derived by the calculation unit; and
 a pulse output unit that performs operations comprising controlling the switching circuits of the power conversion device so as to realize the frequency that is derived by the calculation unit.

2. The power supply control device according to claim 1, wherein
 the calculation unit derives the phase of the fundamental wave of the output voltage based on a result of Fourier series expansion of the staircase waveform created by the calculation unit.

3. The power supply control device according to claim 2, wherein
 the calculation unit derives the discharge phase difference of the snubber element based on: changes in the output voltage based on the staircase waveform; and a magnitude of the output current that is obtained by characteristics of the resonant circuit and an amplitude of the fundamental wave of the output voltage according to the result of the Fourier series expansion of the staircase waveform created by the calculation unit.

4. The power supply control device according to claim 1, wherein
 the pulse output unit controls an output frequency by performing switching control of the switching circuits based on the phase difference derived by the calculation unit.

5. The power supply control device according to claim 1, further comprising:
 an output voltage detection unit that reads an output voltage command value that is set; and
 an input voltage detection unit that detects an input voltage for every phase, the input voltage being input from the multi-phase AC power supply, wherein
 the calculation unit creates the staircase waveform based on the output voltage command value read by the output voltage detection unit and the input voltage for every phase detected by the input voltage detection unit.

6. A power conversion system comprising:
 a power conversion device including a plurality of switching circuits that is connected to a multi-phase AC power supply for every phase and that each has a snubber element capable of being charged and discharged, the power conversion device being configured to: perform AC-AC conversion of input from the multi-phase AC power supply by the plurality of switching circuits; and output the converted AC power via a resonant circuit; and
 the power supply control device according to claim 1, the power supply control device being configured to control the power conversion device.

7. A power supply control method for controlling a power conversion device including a plurality of switching circuits that is connected to an AC power supply and that each has a snubber element capable of being charged and discharged, the power conversion device being configured to: perform AC-AC conversion of input from the AC power supply by the plurality of switching circuits; and output the converted AC power via a resonant circuit, the method comprising:
 creating a staircase waveform of an output voltage that is output from the power conversion device;
 deriving a phase difference between a phase of a fundamental wave of the output voltage that is output from the power conversion device and a phase of an output current based on: the phase of the fundamental wave of the output voltage according to the staircase waveform; a rising phase that is a phase when an absolute value of the output voltage indicated by the staircase waveform reaches a maximum value; and a discharge phase difference based on a period necessary for discharge of the snubber element;
 deriving a frequency to obtain the derived phase difference; and
 controlling the switching circuits of the power conversion device so as to realize the derived frequency.

* * * * *